United States Patent [19]

Arimatsu

[11] Patent Number: 4,542,466
[45] Date of Patent: Sep. 17, 1985

[54] METHOD FOR CONTROLLING THE STATE OF VULCANIZATION OF WHEEL TIRES AND APPARATUS THEREFOR

[75] Inventor: Toshio Arimatsu, Akashi, Japan

[73] Assignee: Sumitomo Rubber Industries, Ltd., Hyogo, Japan

[21] Appl. No.: 652,158

[22] Filed: Sep. 18, 1984

Related U.S. Application Data

[63] Continuation of Ser. No. 370,823, Apr. 22, 1982, abandoned.

[30] Foreign Application Priority Data

Apr. 28, 1981 [JP] Japan .................................. 56-64759

[51] Int. Cl.$^4$ .......................... B29H 5/02; B29H 5/24; G05B 15/02; G05D 21/02
[52] U.S. Cl. .................................... 364/473; 364/476; 364/180; 364/500; 264/40.1; 264/40.6; 374/53; 425/29; 425/30
[58] Field of Search ................................ 364/473, 476

[56] References Cited

U.S. PATENT DOCUMENTS

| 3,659,974 | 5/1972 | Neugroschi | 425/29 |
| 3,819,915 | 6/1974 | Smith | 425/29 X |
| 3,980,743 | 9/1976 | Smith | 425/29 X |
| 4,022,555 | 5/1977 | Smith | 364/500 X |
| 4,344,142 | 8/1982 | Diehr, II et al. | 364/473 |

Primary Examiner—Jerry Smith
Assistant Examiner—Allen MacDonald
Attorney, Agent, or Firm—Birch, Stewart, Kolasch & Birch

[57] ABSTRACT

A method for controlling the state of vulcanization of a wheel tire which comprises controlling the process steps of a vulcanizing process preceeding the heating step according to a time mode, controlling the heating step according to an equivalent cure unit control mode and again controlling the process steps subsequent to the heating step according to the time mode. A vulcanization apparatus is also disclosed.

10 Claims, 13 Drawing Figures

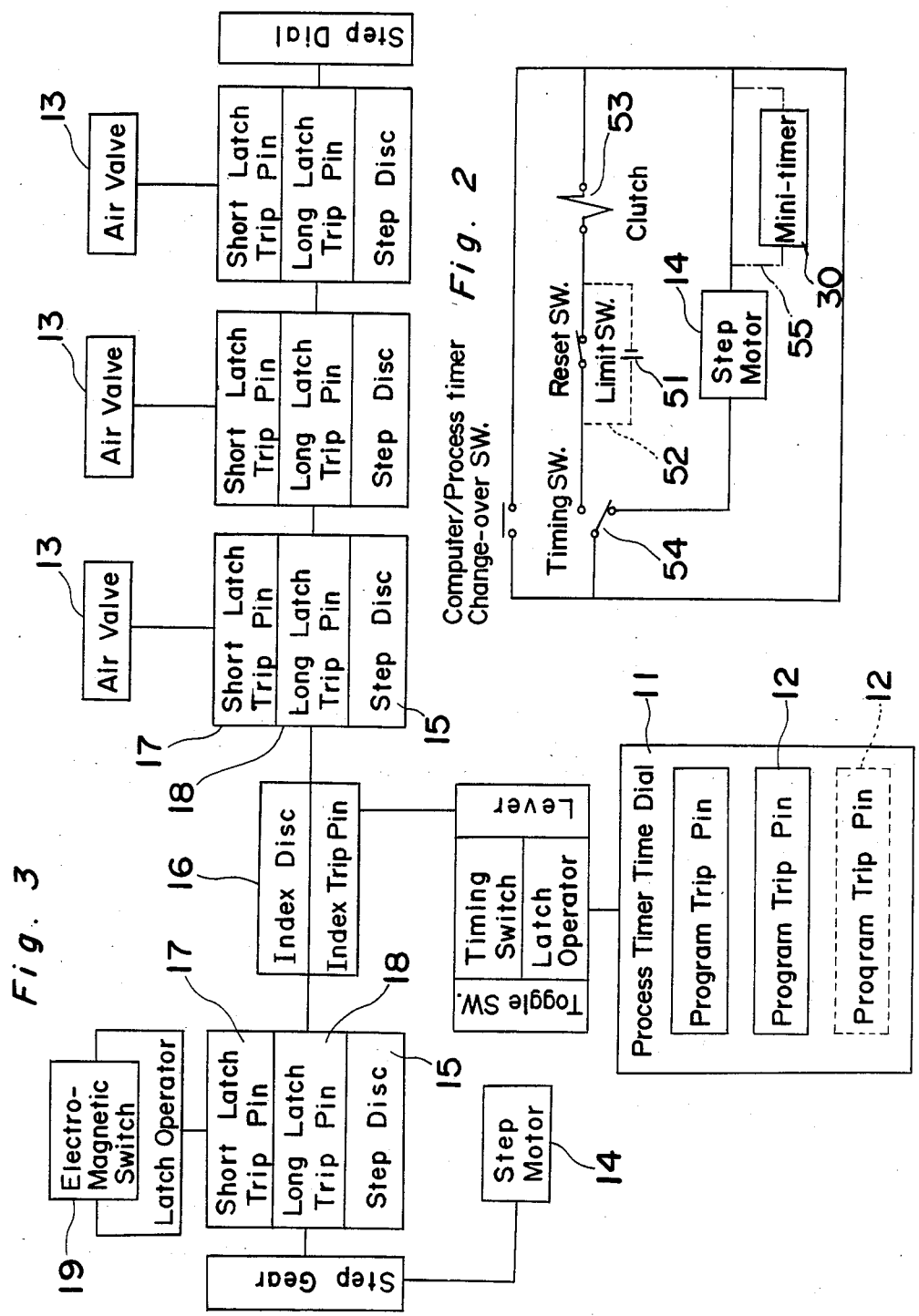

METHOD FOR CONTROLLING THE STATE OF VULCANIZATION OF WHEEL TIRES AND APPARATUS THEREFOR

This application is a continuation, of application Ser. No. 370,823 filed on Apr. 22, 1982 now abandoned.

The present invention generally relates to a method and an apparatus for controlling the state of vulcanization of wheel tires and, more particularly, to a method and an apparatus utilizing a computer and a process timer so that the state of vulcanization of individual wheel tires being heat-treated during a vulcanizing process can be controlled according to one or both of an equivalent cure unit mode and a time mode.

Hetherto, attempts have been made to use one or both of an equivalent cure unit control method and a time control method in controlling the state of vulcanization of individual wheel tires by the use of a computer effective to continuously and successively generate various command signals for controlling various process steps. The known time control method comprises measuring the time actually required to perform each process step during the vulcanizing process, generating an electrical time signal proportional to the actual time so measured, comparing this time signal with a reference command signal indicative of a preset reference time, and controlling vulcanizing process steps in response to an output signal which is generated when the time signal has been found coinciding with the reference command signal. The known equivalent cure unit control method comprises causing the computer to monitor the temperature inside the wheel tire, measured by a temperature sensor such as a thermistor or a thermocouple installed inside the tire placed in a tire forming mold, as a function of time during each process step of the vulcanizing process, calculating an actual amount of equivalent cure unit based on the measured temperature by the use of the Arrhenius' equation, generating an electrical signal proportional to the measured amount of equivalent cure unit, comparing this signal with a reference command signal representative of a predetermined amount of equivalent cure unit, and controlling the vulcanizing process steps in response to an output signal which is generated when the signal has been found coinciding with the reference command signal.

Although the conventional method is known as advantageous in that the quality of wheel tires produced can be improved with the minimized possibility of deviation in vulcanization and that the time required to perform the vulcanization can be reduced with consequent increase in productivity and energy saving, an apparatus designed for performing this conventional method is inevitably complicated and expensive and requires complicated and excessive procedures to operate it. This is because, the conventional method is such that one or both of the amount of equivalent cure unit and the time are controlled by the computer, having a time control circuit, with respect to all of the vulcanizing process steps including the steps of heating, cooling, and exhausting and because such component parts as input and output interface mechanism, control mechanisms and the like are, therefore, complicated and bulky and require high costs for installation thereof.

With a view toward substantially eliminating the foregoing disadvantages and toward providing a method and an apparatus for controlling the vulcanization of wheel tires which are inexpensive and simple to operate, toward manufacturing wheel tires of high quality with no deviation in vulcanization uniformity and with a saving of energy involved in the production thereof, and toward avoiding any possible over-cure or under-cure vulcanization even if the apparatus operates erroneously, the inventor of the present application has conducted a series of studies. As a result thereof, it has been found that the control of the time or the amount of equivalent cure unit is not necessary during each of the vulcanizing process steps, but rather only during the heating step of the vulcanizing process. Accordingly, the present invention is featured in that both the conventionally utilized process timer (provided with a step mechanism and a timing mechanism) and the computer having no time control circuit are utilized so that the process timer can generate a switching signal indicative of the completion of the heating step dependent on or in accordance with the amount of equivalent cure unit which has been calculated by the computer. In this way, the present invention is based on the finding that it is sufficient to effect the control by the equivalent cure unit mode only during the heating step of the vulcanizing process.

The present invention will become readily understood from the following detailed description taken in conjunction with preferred embodiment thereof with reference to the accompanying drawings, in which:

FIG. 2 is a diagram showing a rapid turn circuit of a process timer used in the present invention;

FIG. 3 is a block diagram of an analog process timer;

Figure 1:
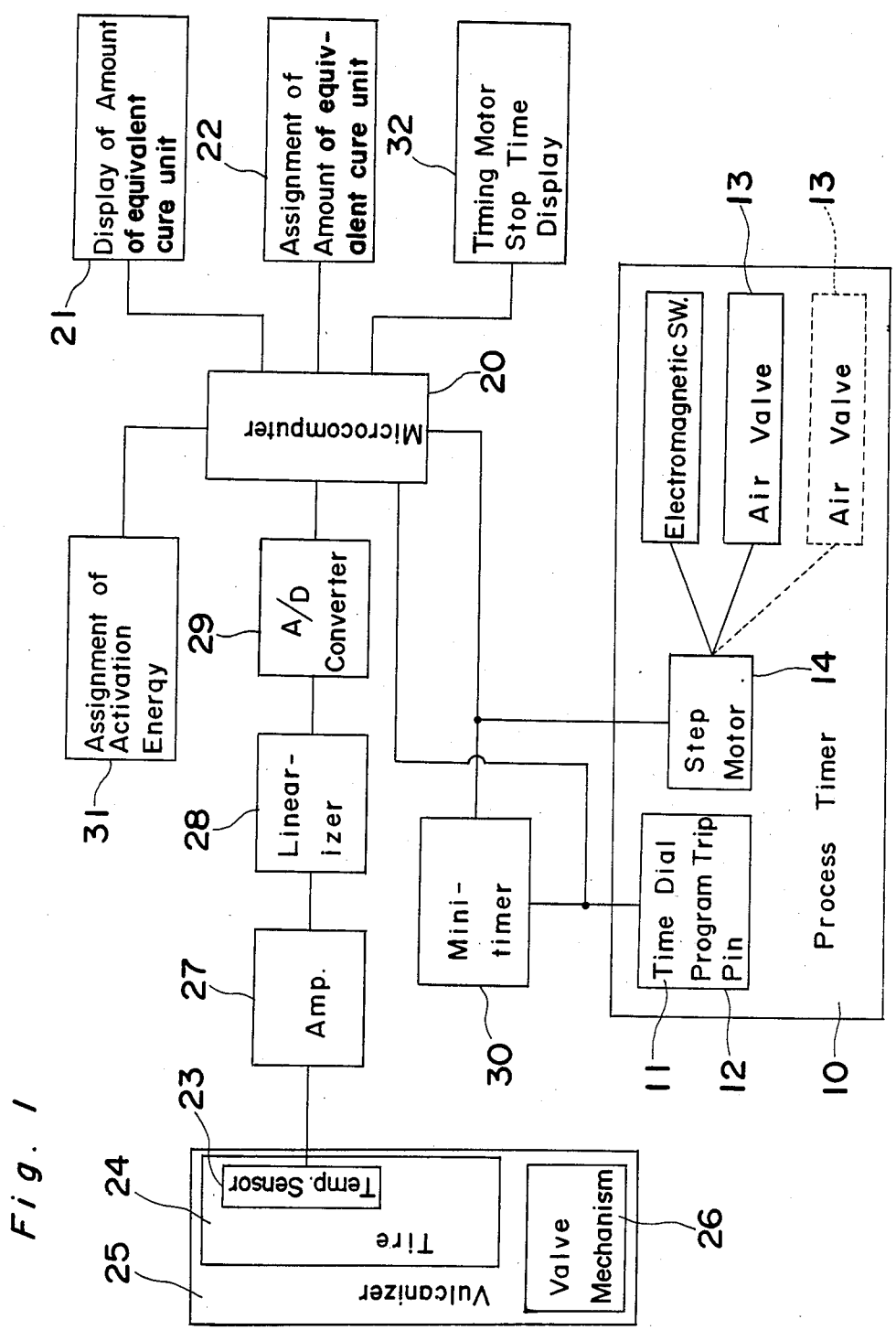
FIG. 1 is a block diagram of an apparatus according to the present invention.

The vulcanizing process herein referred to comprises a shaping step wherein a vulcanizing bag is inflated, a heating step, a cooling step, an exhausting step and a vacuum step all performed in the sequence given above. This vulcanizing process is controlled according to a time mode or time-based mode by the use of a process timer 10 shown in FIG. 1 and as will be described later. Referring to FIG. 3, for controlling the vulcanizing process in the manner as hereinabove described, a program trip pin 12 corresponding to a predetermined time required to perform a respective step of the vulcanizing process is first set to a time dial 11 of the process timer and, at the start and the termination of the respective process step, a signal from an air valve 13 of the process timer 10 is applied to a valve mechanism 26 of a vulcanizing machine 25 so that the respective process steps are commenced or terminated in accordance with the presence or absence of such signal, respectively.

The heating step of the vulcanizing process is a step wherein a heating medium such as, for example, steam or heated water is supplied into the vulcanizing bag inserted into the interior of a wheel tire in a tire forming mold and is performed for a substantial period of time subsequent to the shaping step, but prior to the cooling step. This heating step, according to the present invention, is controlled according to an equivalent cure unit mode as will be described later.

A computer 20 used in the practice of the present invention is of a type capable of monitoring the temperature of the wheel tire detected by a temperature sensor 23 as will be described later, then calculating the actual amount 21 of equivalent cure unit (the actual equivalent cure amount) or parity vulcanization on the basis of the measured temperature of the tire according to the known Arrhenius' equation or its coefficient formula, and comparing the actual amount of equivalent cure unit with a predetermined amount thereof. As an arithmetic section for calculating the amount of equivalent cure unit, the use of the general purpose microcomputer 20 having no time control circuit and, as a control section, the concurrent use of the microcomputer 20 or a logic circuit are preferred. Some examples of the circuit arrangement of the microcomputer 20 utilizable in the present invention are respectively shown in FIGS. 5 to 10.

Figure 4:
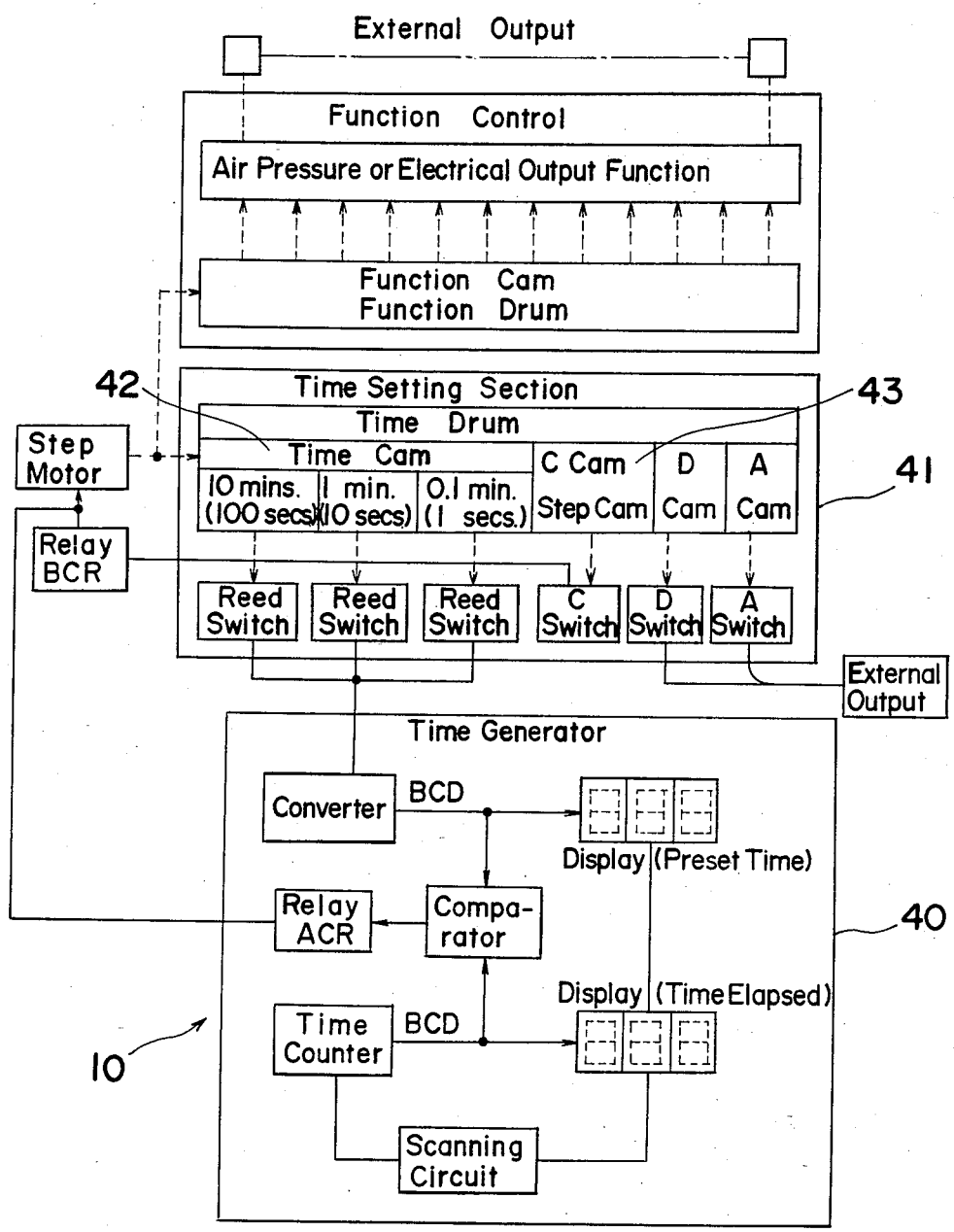
FIG. 4 is a block diagram of a digital process timer.
Figure 12:
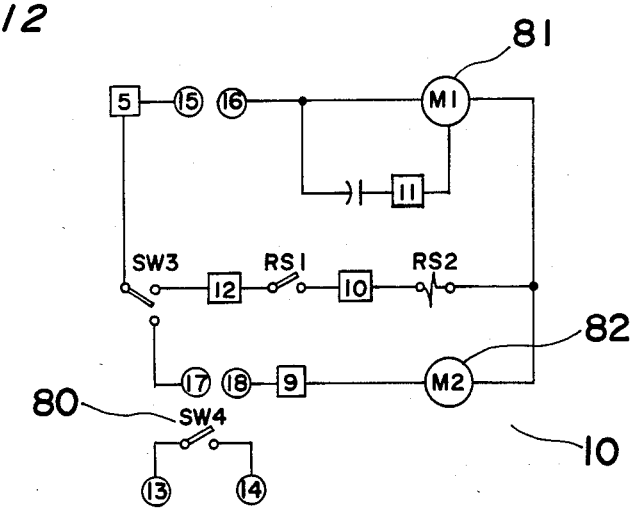
FIG. 12 is a block diagram of a different type of analog process timer.

The process timer 10 is, as shown in FIG. 1, electrically connected to the computer 20 and may be constituted either by a known analog process timer which is inherently provided in a known tire vulcanizing machine and which comprises, as shown in FIG. 3, a clock section including, as its main components, the time dial 11 and the program trip pins 12, and a step section including, as its main components, a step motor 14, step discs 15, index discs 16, microswitches and air valves 13, or by a known digital process timer which comprises, as shown in FIG. 4, a digital section 40 for displaying the position of the vulcanizing process step being performed and the time elapsed during each process step and a step section 41 including, as its main components, step cams 43 and time cams 42 and which is so designed as to generate a switching signal, which may be either electrical or pneumatic, according to an arbitrarily determined time table. It is to be noted that an embodiment of a portion of the circuit of the analog process timer 10 is shown in FIG. 12.

Referring still to FIG. 3, in the analog process timer 10, the time of each process step of the vulcanizing process is set at the time dial 11 by means of the respective program trip pin 12 and, therefore, an electrical signal indicative of a predetermined value of each elapsed time is generated therefrom. It is, however, to be noted that the time elapsed to perform the heating step of the vulcanizing process may not be set in the process timer 10 or. The minimum or maximum necessary value of the time elapsed may be set or, in the case of the digital process timer 10, both the minimum necessary value and the maximum necessary value can be set in parallel therein. In these cases, the minimum value set in the process timer 10 serves the purpose of preventing the heating step from going to completion before the lapse of the predetermined minimum time even though the actual amount of equivalent cure unit has become equal to the predetermined amount of equivalent cure unit. On the other hand, the maximum value serves the purpose of forcibly terminating the heating step upon the lapse of the predetermined maximum time in the event that the actual amount of equivalent cure unit fails to equal the predetermined amount of equivalent cure unit by a reason attributable to an erroneous operation of the computer 20.

It is also to be noted that, in the digital process timer 10 (FIG. 4), the minimum necessary time for the heating step and the maximum necessary time for the heating step are to be set at first and second step section, respectively, by the utilization of time cams 42 and step cams 43.

The process timer 10 is provided with the air valves 13, as is the case with the conventional process timer, which air valves constitute a unit for generating a signal to a valve mechanism operable at the start and termination of each process step for initiating and interrupting the supply of a vulcanizing medium, respectively. It is also provided with an electromagnetic switch 19, as shown in FIG. 3, as a unit operable upon the lapse of the time required to perform the heating step for generating a signal indicative of the timing at which the actual and predetermined amounts of equivalent cure unit are to be compared with each other.

It is possible to cause an interrupt signal to be generated when the program trip pin 12 for the completion of the heating step is kicked off. For this reason, the setting of the step section of the process timer 10 will be completed when, as shown in FIG. 3, a short latch trip pin 17 of the step disc 15 for actuating the electromagnetic switch 19 connected with the computer is set at a position substantially intermediate between the position at which a short latch trip pin 17 of the step disc for opening the air valve 13 during the heating step has been set and the position at which a long latch trip pin 18 for closing the air valve 13 has been set. By so doing, the interrupt signal can be generated. Although the setting of the step section requires the exclusive use of one step disc 15, it makes it unnecessary to supply to the step section an input determinative of the order of sequence in which the program trip pins 12 are to be kicked off. By the utilization of this system in which the interrupt signal is generated in the manner as hereinbefore described, what is necessary is only to do a job of changing the program trip pin 12 of the time dial 11 of the process timer 10 at the time of switching the control of vulcanization over to the equivalent cure unit mode. Therefore, no complicated and time-consuming change and adjustment of the step section are required and, thus, the changing job can readily be performed in a minimized length of time.

The known process timer has built therein a mechanism for rapidly turning the time dial in response to an output signal from the step section, and this rapid turning mechanism comprise a standard gear for turning the time dial at a standard speed, a rapid gear for turning the time dial at a high speed, an electromagnetic clutch operatively associated with both of these gear mechanism for selectively bringing these gear mechanisms into operation one at a time and a motor constituting a drive source. According to the prior art equivalent cure unit control method based on the time mode, an output signal indicative of the completion of one cycle of vulcanization is generated from the step mechanism of the process timer to actuate the electromagnetic clutch so that the rapid gear can be brought into operation to cause the time dial to rapidly turn to the start position for the next succeeding cycle of vulcanization. The present invention is also featured in that a bypass circuit, shown by the broken line 52 in FIG. 2, having a limit switch 51 adapted to be actuated upon receipt of a signal from the computer is provided in a conventional rapid turn circuit for the vulcanizing process so that the electromagnetic clutch 53 can be actuated upon receipt of a signal indicative of the coincidence of the actual amount of equivalent cure unit with the predetermined value thereof to switch over to the rapid gear wherewith the time dial 11 can be rapidly turned to the start point for the next succeeding cycle of the vulcanizing process. Because of this design, the time required to perform the heating step of the vulcanizing process can advantageously be shortened in view of the fact that the heating step can be terminated earlier than that according to the prior art.

Figure 11:
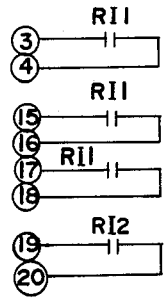
FIG. 11 is a block diagram of an interface circuit between the microcomputer and the process timer.

The details of the interface circuit are shown in FIG. 11.

The temperature sensor 23 utilizeable in the practice of the present invention is preferably a thermocouple. This temperature sensor 23 is preferably to be located at a predetermined position, for example, a shoulder, inside the raw tire 24. This temperature sensor 23 may be alternatively positioned on the surface of the tire or in the tire forming mold. In any event, this temperature sensor 23 should be so designed and so supported in operative association with any suitable means such as an air cylinder that it can removably be moved to the predetermined position through a passage defined and extending through in the wall of the tire forming mold.

A temperature measuring mechanism comprises, as its main components, a series-connected circuit of linearizer 28 and analog-to-digital converter 27 and is inserted between the temperature sensor 23 and the computer 20 as shown in FIG. 1. This temperature measuring mechanism is so operable as to generate an output signal of a current or voltage proportional to the temperature detected by the temperature sensor 23.

An additional timer 30 is, as shown in FIG. 1, inserted between the process timer 10 and the computer 20 and is in the form of any known mini-timer of simple construction. This additional timer 30 is operable to set the minimum necessary time for the heating step to be performed, so that unless such minimum necessary time is elapsed, the heating step will not terminate even if the actual amount 21 of equivalent cure unit has become equal to the predetermined amount 22 thereof. This timer 30 is also operable to set the maximum necessary time for the heating step to be performed, so that in the event of any possible erroneous operation, the heating step will be forcibly terminated upon the lapse of this maximum necessary time. This timer 30 is connected with the process timer 10 in such a manner as shown in FIG. 2. Specifically, the timer 30 is inserted in a circuit shown by the chain line 55 in FIG. 2, which is provided in the step section of the process timer 10 and which is so designed as to be energized when the step motor 14 is driven in response to a signal from a timing switch 54 and as to be deenergized when the step motor 14 ceases its operation.

Input signals received by this control device include, among others, a signal indicative of that the program trip pin 12 in the process timer 10 has been kicked off, an interrupt signal generated when the program trip pin 12 is kicked off, a signal indicative of the predetermined amount 22 of equivalent cure unit, a signal indicative of the amount 31 of activation energies calculated by the Arrhenius' equation or its coefficient formula, a signal from the process timer 10, and a signal indicative of the predetermined lapse time set by the timer 30.

Output signals emerging from the control device include, among others, a signal indicative of whether or not the selective opening and closing of a valve mechanism 26 is possible, a signal indicative of the amount of equivalent cure unit per time elapsed, a signal indicative of the time during which the process timer 10 has been held inoperative, a signal to be used for selectively inserting and withdrawing a sensor probe of the temperature sensor 23, an interrupt signal corresponding to the lapse of the minimum necessary time set by the process timer 10, and a signal to be used to rapidly turn the time dial 11.

A mechanism for interrupting the supply of the heating medium stands for the valve mechanism (diaphragm valve) 26 in the vulcanizing machine 25 and is adapted to be selectively opened and closed in response to a signal fed from the air valve 13 in the process timer 10.

In this control device, the predetermined amount 22 of equivalent cure unit, the activation energy 31, the amount 21 of equivalent cure unit per elapsed time and the time 32 during which the process timer 10 has been held inoperative are all displayed by means of a respective digital display.

The amount 21 of equivalent cure unit of the wheel tire calculated by the computer 20 upon receipt of the digital signal indicative of the temperature inside the tire can be determined using the following Arrhenius' equation which is generally used in the determination of any chemical reaction including vulcanization of rubber material.

$$U = \int e^{\frac{E}{R}(1/T - 1/T_0)} \, dt$$

wherein
U: Amount of Equivalent Cure Unit,
E: Activation Energy,
R: Gas constant,
T: Temperature (Vulcanizing Temperature),
To: Reference Temperature, and
t: Time (Vulcanizing Time)

It is to be noted that, in practice, it suffices to integrate the value using the temperature measured at intervals of, for example, one or two minutes.

The following equation (coefficient formula) may be used as an equivalent equation.

$$U = \int C^{\frac{T-T_0}{Y}} \cdot dt$$

wherein C and Y respective coefficients.

The predetermined amount of equivalent cure unit can be determined empirically and by conducting a series of experiments.

Examples of one cycle of procedures for the vulcanization controlled according to the present invention will now be described step by step for the purpose of illustration of the method of the present invention.

EXAMPLE 1

(1) Times for the respective steps of the vulcanizing process to be performed are set to the process timer 10.

(2) The signal indicative of the activation energy 31, the signal indicative of the reference temperature, the signal indicative of the predetermined amount 22 of equivalent cure unit and the signal generated when the program trip pin 12 is kicked off at the time of completion of the heating step are all supplied to the microcomputer 20.

Figure 13:
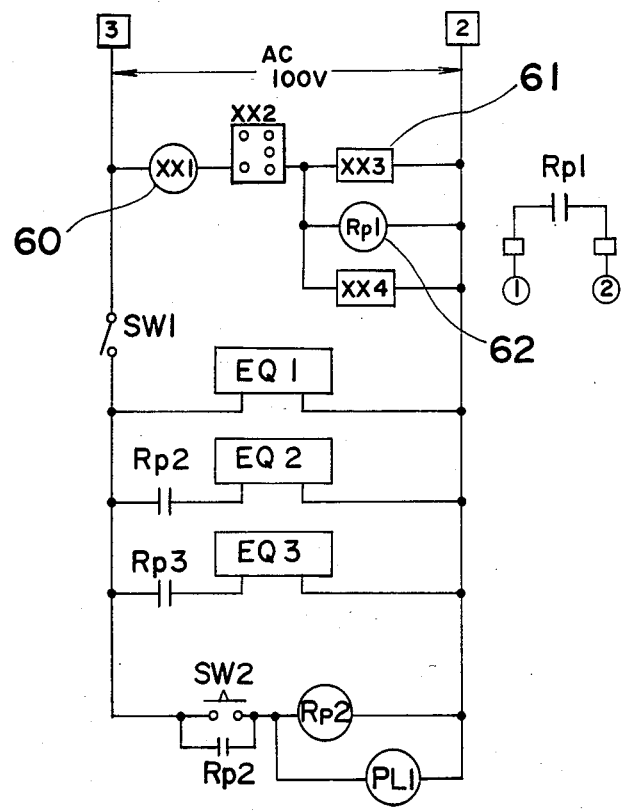
FIG. 13 is a block diagram of a power source circuit used in the present invention.

(3) When the vulcanizing machine is brought to a closed position, an xx1 relay 60 shown in FIG. 13 is activated to operate an xx3 timer 61, wherewith the vulcanization is initiated.

Figure 5:
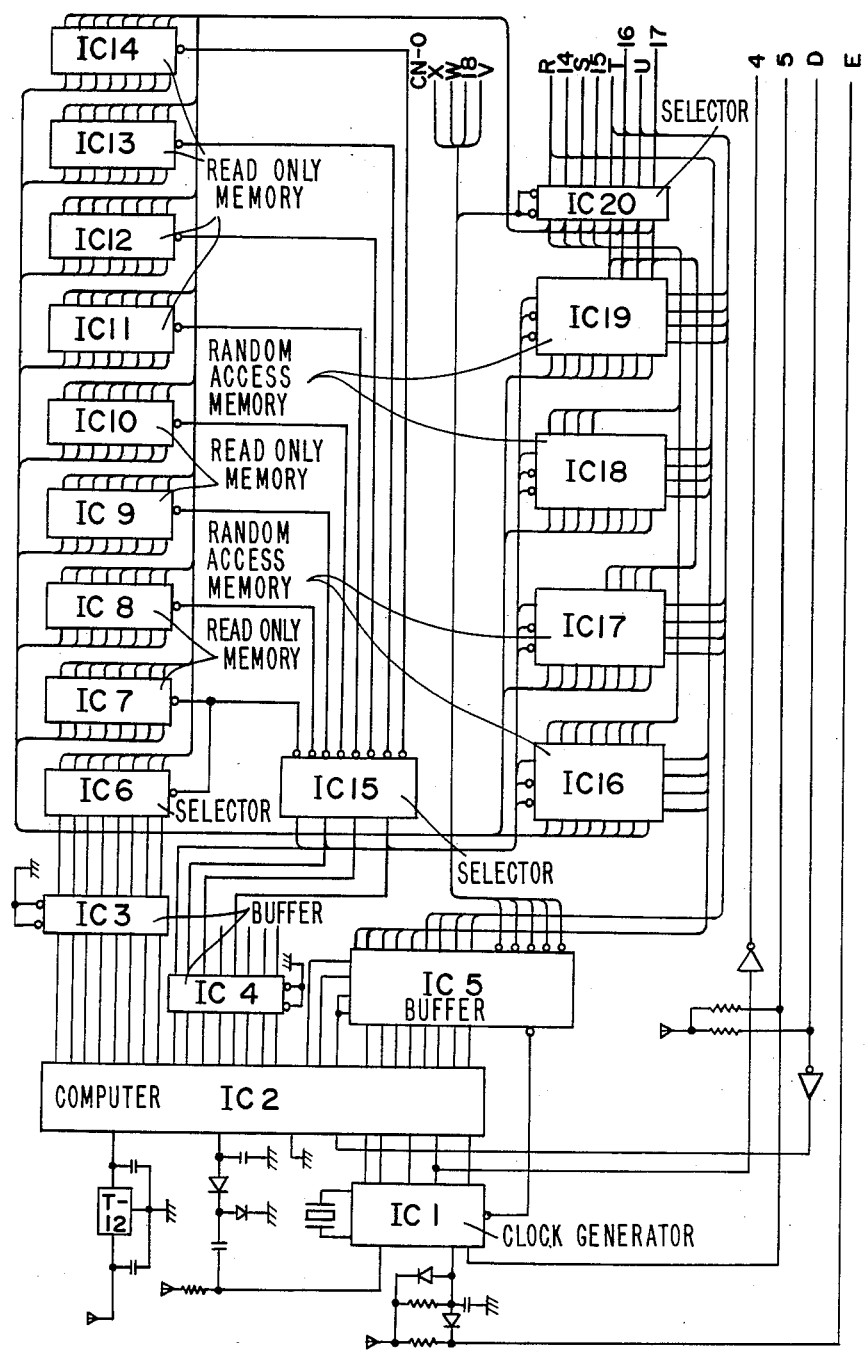
FIGS. 5 to 10 are block diagrams showing a microcomputer according to different embodiments of the present invention.
Figure 6:
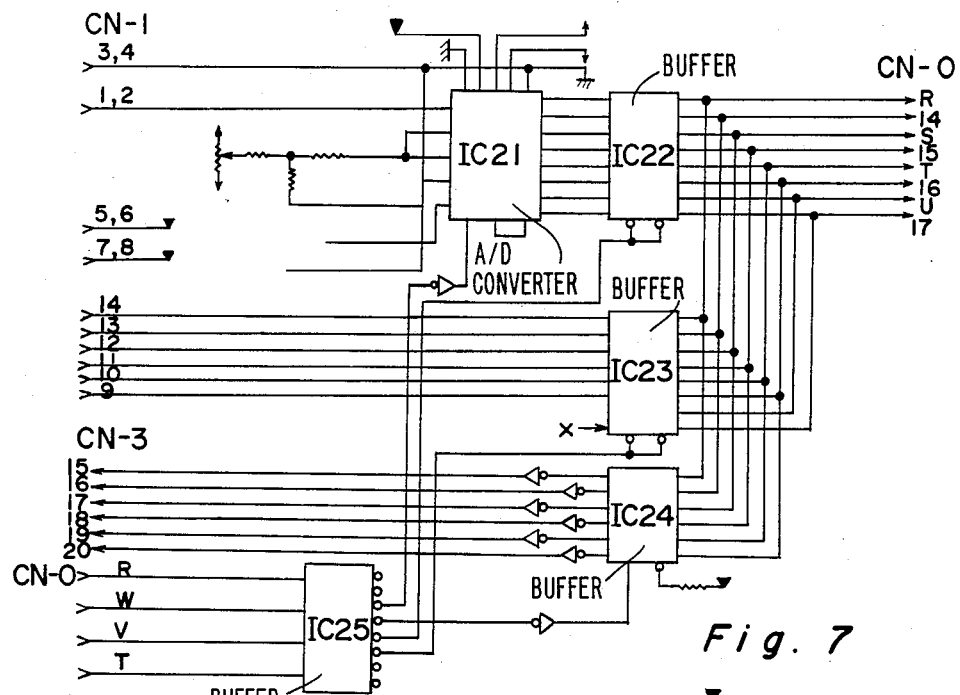
Figure 7:
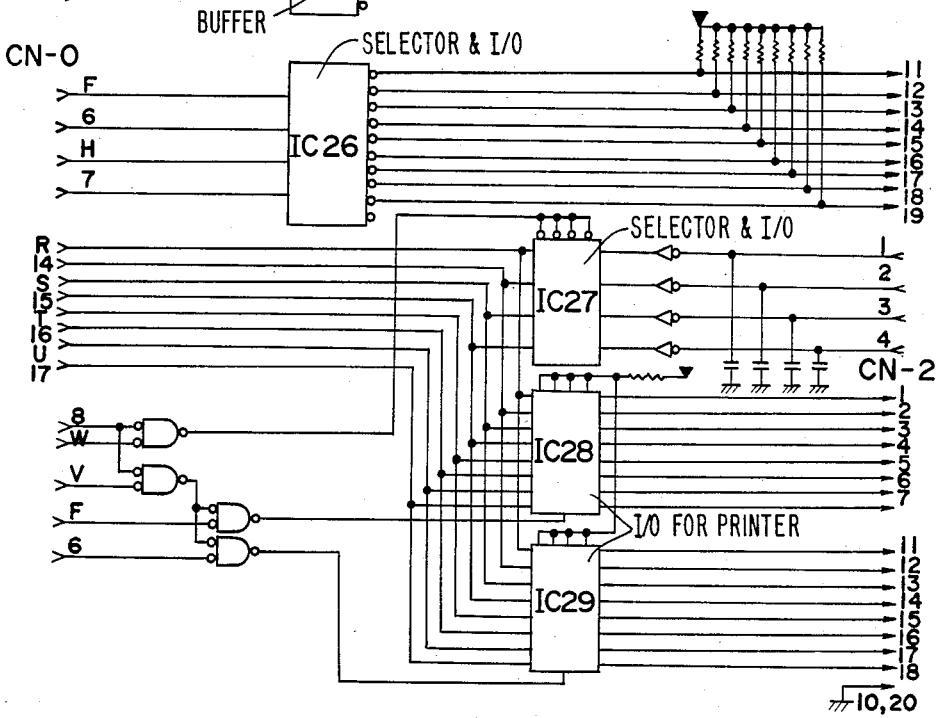
Figure 8:
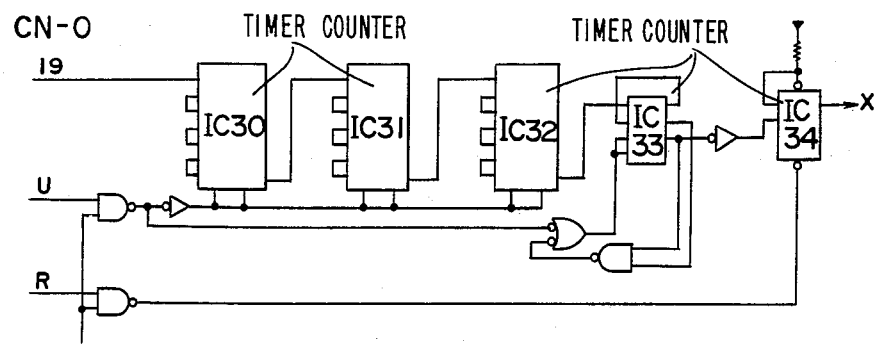
Figure 9:
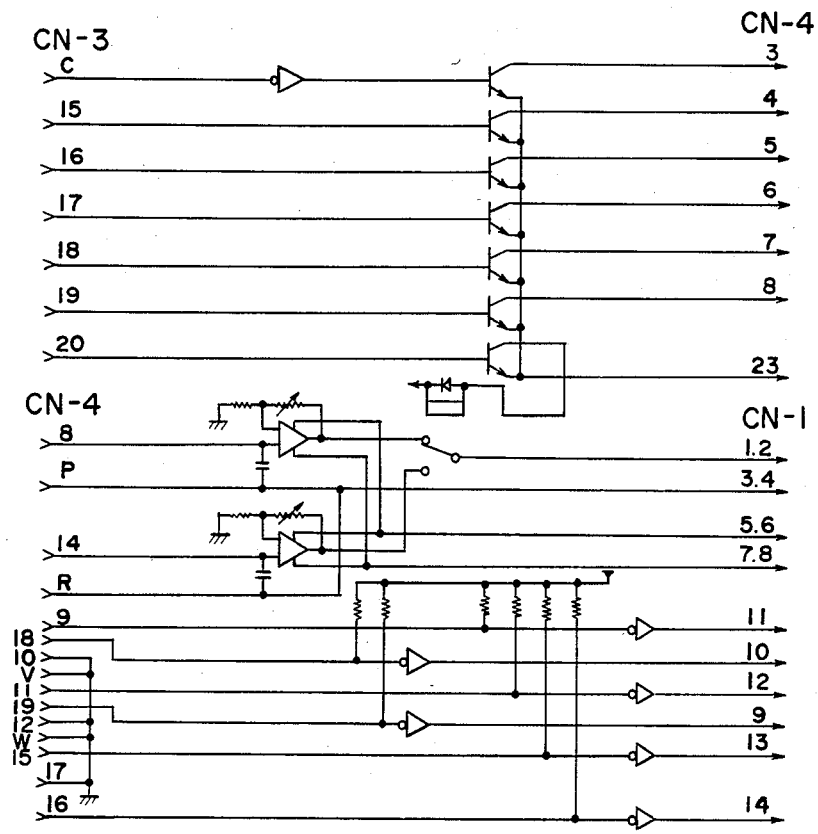

(4) Simultaneously therewith, an $R_p1$ relay 62 shown in FIG. 13 and an x6 relay 70 shown in FIG. 5 are activated to cause the computer 20 to start its operation.

(5) After a predetermined time set by a T1 timer 71 has elapsed, the sensor probe of the temperature sensor 23, for example, the thermocouple, is inserted into the interior of the tire through the insertion hole in the tire forming mold.

(6) After the insertion of the sensor probe and after check has subsequently been made as to whether or not the sensor probe has accurately and with no doubt been inserted into the interior of the tire, the computer 20 starts the measurement of the temperature and the calculation of the amount of equivalent cure unit.

(7) The vulcanizing machine 25 is time-controlled by the process timer 10 until the program trip pin for terminating the heating step is kicked off.

(8) By conditioning the switch 80, which is in the process timer 10 and is adapted to be actuated when the program trip pin for terminating the heating step is cut off, in a manner as shown by SW4 in FIG. 12, the process timer 10 is brought to a halt temporarily.

(9) Simultaneously therewith, R10 and R11 relays 90 and 91 shown in FIG. 11 are activated whereby comparison of the measured amount 21 of equivalent cure unit with the predetermined amount 22 of equivalent cure unit is carried out in the computer 20.

Figure 10:
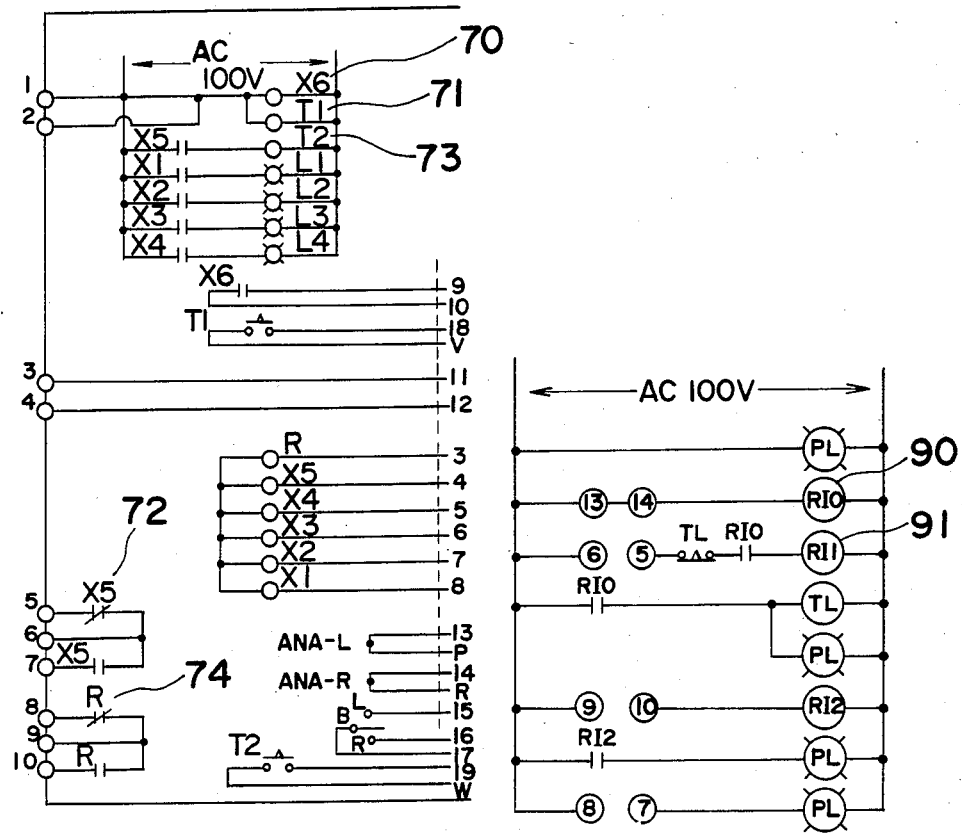

(10) When the measured amount 21 of equivalent cure unit has been found equal to or exceeding the predetermined value 22, an x5 relay 72 shown in FIG. 10 is activated to activate an R1 relay 91 shown in FIG. 11, thereby permitting M1 and M2 motors 81 and 82 to be again driven (i.e., the process timer 10 starts to operate).

(11) The subsequent process steps are controlled by the process timer 10 according to the time mode.

(12) In addition, by activating an R relay 74 after the lapse of a predetermined time set in a T2 timer 73, the sensor probe of the temperature sensor 23 is withdrawn from the interior of the tire 24.

(13) The amount 21 of equivalent cure unit measured up until the withdrawal of the sensor probe of the temperature sensor 23 is outputted to a printer as data together with the time elapsed.

(14) When the vulcanizing machine 25 is brought to an opened position upon completion of the state of vulcanization, the xx1 relay 60 is activated to bring the computer into a stand-by position.

When the vulcanizing machine 25 is subsequently brought to the closed position, the next succeeding cycle is initiated, repeating the above described procedures.

It is to be noted that, in this example, it may be possible to design so as to initiate the comparison of the actual amount of equivalent cure unit with the predetermined amount of equivalent cure unit after the interrupt signal corresponding to the termination of the time for the heating step has been generated from the process timer 10.

EXAMPLE 2

(1) The signal indicative of the predetermined amount 22 of equivalent cure unit, the signal generated when the program trip pin 12 in the process timer 10 is kicked off at the time of completion of the heating step, the signal indicative of the activation energy 31 and a signal indicative of a value set to the timer 30 are supplied to the computer 20.

(2) The time for the respective steps of the vulcanizing process to be performed are set to the process timer 10. In particular, so far as the heating step is concerned, the minimum necessary time is set to the process times 10 and, the maximum necessary time should be set to the additional timer 30.

(3) The tire is then placed in the tire forming mold of the vulcanizing machine 25.

(4) Simultaneous with the closure of the vulcanizing machine 25, the process timer 10 is switched on. Subsequently, the sensor probe of the temperature sensor 23 is inserted into the shoulder of the tire 24 through the insertion hole in the tire forming mold.

(5) Simultaneously with the switching on of the process timer 10, the heated water is supplied into a bladder. The process timer 10 continues to operate and the linearizer 28 and the converter 29 measure the temperature at the shoulder of the tire, whereas the microcomputer 20 continues to calculate the amount 21 of equivalent cure unit.

(6) When the process timer 10 kicks off the program trip pin 12 on the time dial 11 for terminating the heating step (Before the program trip pin 19 is kicked off, controlled by the process timer 10 according to the time mode), the electromagnetic switch 19 is turned on and, at the same time, the process timer 10 suspends its operation to assume a stand-by position, whereas the microcomputer 20 compares the actual amount 21 of equivalent cure unit with the predetermined amount 22 of equivalent cure unit which has previously been set thereto.

(a) Where the actual amount 21 of equivalent cure unit is greater than the predetermined value 22, the air valve 13 of the process timer 10 is operated to close the diaphragm valve for the heating water on the one hand and to open the diaphragm valve for a cooling water on the other hand and, at the same time, the process timer 10 which has been held in the stand-by position resumes its operation.

(b) Where the actual amount 21 of equivalent cure unit is smaller than the predetermined value 22, the supply of the heating water is continued and, when the actual amount 21 of equivalent cure unit becomes equal to the predetermined value 22, the air valve 13 is operated to switch the diaphragm valves.

(c) Where the actual amount 21 of equivalent cure unit does not attain a value equal to the predetermined amount 22 by the reason attributable to an erroneous operation of the apparatus, the air valve 13 is operated upon the lapse of the time preset to the mini-timer 30 to switch the diaphragm valves.

(7) At the time a signal switching the diaphragm valves is generated during the preceeding step (6), a signal for operating the process timer 10 is generated, wherewith the process timer 10 which has been held in the stand-by position resumes its operation. The process steps subsequent to the completion of the heating step are controlled by the process timer 10 according to the time mode.

(8) When the time set to the process timer 10 for the cooling step to be performed has elapsed, the diaphragm valve for the cooling water is closed and the diaphragm valve for exhausting is opened.

(9) When the time set to the process timer 10 for the exhausting step to be performed has elapsed, the diaphragm valve for exhausting is closed and the diaphragm valve for vacuum is opened.

(10) When the time set to the process timer 10 for the vacuum step to be performed has elapsed, the diaphragm valve for the vacuum is closed and the vulcanizing machine 25 is opened, thereby completing one cycle operation.

(11) The sensor probe of the temperature sensor 23 is withdrawn by the air cylinder from the tire 24 and the tire forming mold before the completion of the state of vulcanization.

(12) The amount 21 of equivalent cure unit measured up until the withdrawal of the sensor probe is displayed as data by means of the printer together with the time then elapsed.

(13) The computer 20 is brought to the stand-by position upon the opening of the vulcanizing machine 25 subsequent to the completion of the state of vulcanization.

The above described procedures are repeated for the next succeeding cycle.

In this example, the process timer 10 may be provided with a step section for generating an interrupt signal corresponding to the termination of the time required to perform the heating step so that the comparison of the actual amount of equivalent cure unit with the predetermined amount thereof can be initiated in response to such interrupt signal.

EXAMPLE 3

(1) The signal indicative of the predetermined amount 22 of equivalent cure unit, the signal generated when the program trip pin 12 in the process timer 10 is kicked off at the time of completion of the heating step, and the signal indicative of the activation energy 31 are supplied to the computer 20.

(2) Times for the respective steps of the vulcanizing process to be performed are set to the process timer 10. In particular, with respect to the heating step, the maximum necessary time therefor is set to the process timer 10. In addition, the rapid turn circuit for the time dial 11 of the process timer 10 is provided with a rapid turn circuit for the heating step.

(3) The tire is then placed in the tire forming mold of the vulcanizing machine 25.

(4) Simultaneous with the closure of the vulcanizing machine 25, the process timer 10 is switched on. Subsequently, the sensor probe of the temperature sensor 23 is inserted into the shoulder of the tire 24 through the insertion hole in the tire forming mold.

(5) Simultaneously with the switching on of the process timer 10, the heated water is supplied into a bladder. The process timer 10 continues to operate and the linearizer 28 and the converter 29 measure the temperature at the shoulder of the tire, whereas the microcomputer 20 continues to calculate the amount 21 of equivalent cure unit.

(6) Where the result of the comparison shows that the actual amount 21 of equivalent cure unit is equal to the predetermined value 22 (until this time, controlled by the process timer 10 according to the time mode,), the time dial 11 of the process timer 10 upon receipt of the signal indicative of the coincidence between these amounts 21 and 22 is turned rapidly with the supply of the heating water completed while the supply of the cooling water is initiated. Subsequent to the completion of the heating step, it is controlled by the process timer 10 according to the time mode.

(7) When during the above described operation the maximum necessary time for the heating step has elapsed while the actual amount 21 of equivalent cure unit remains smaller than the predetermined amount 22 thereof, the supply of the heating water is interrupted on the one hand and the supply of the cooling water is initiated on the other hand irrespective of the actual amount of equivalent cure unit.

(8) When the time set to the process timer 10 for the cooling step to be performed has elapsed, the diaphragm valve for the cooling water is closed and the diaphragm valve for exhausting is opened.

(9) When the time set to the process timer 10 for the exhausting step to be performed has elapsed, the diaphragm valve for exhausting is closed and the diaphragm valve for vacuum is opened.

(10) When the time set to the process timer 10 for the vacuum step to be performed has elapsed, the diaphragm valve for the vacuum is closed and the vulcanizing machine 25 is opened, thereby completing one cycle of operation.

(11) The sensor probe of the temperature sensor 23 is withdrawn by the air cylinder from the tire 24 and the tire forming mold before the completion of the state of vulcanization.

(12) The amount 21 of equivalent cure unit measured up until the withdrawal of the sensor probe is displayed as data by means of the printer together with the time then elapsed.

(13) The computer 20 is brought to the stand-by position upon the opening of the vulcanizing machine 25 subsequent to the completion of the state of vulcanization.

The above described procedures are repeated for the next succeeding cycle.

In this example, the process timer 10 may be provided with a step section for generating an interrupt signal corresponding to the termination of the time required to perform the heating step so that the comparison of the actual amount of equivalent cure unit with the predetermined amount thereof can be initiated in response to such interrupt signal.

EXAMPLE 4

(1) The signal indicative of the predetermined amount 22 of equivalent cure unit, the signal generated when the program trip pin 12 in the process timer 10 is kicked off at the time of completion of the heating step, and the signal indicative of the activation energy 31 are supplied to the computer 20.

(2) Times for the respective steps of the vulcanizing process to be performed are set to the process timer 10. In particular, with respect to the heating step, the maximum necessary time therefor is set to the process timer 10. In addition, the minimum necessary time therefore should be set to the mini-timer 30.

(3) The tire is then placed in the tire forming mold of the vulcanizing machine 25.

(4) Simultaneous with the closure of the vulcanizing machine 25, the process timer 10 is switched on. Subsequently, the sensor probe of the temperature sensor 23 is inserted into the shoulder of the tire 24 through the insertion hole in the tire forming mold.

(5) Simultaneously with the switching on of the process timer 10, the heated water is supplied into a bladder. The process timer 10 continues to operate and the linearizer 28 and the converter 29 measure the temperature at the shoulder of the tire, whereas the microcomputer 20 continues to calculate the amount 21 of equivalent cure unit.

(6) Upon the lapse of the time set to the mini-timer 30, the microcomputer 20 compares the actual amount 21 of equivalent cure unit with the predetermined amount 22 and, when the both become equal to each other, the time dial 11 is rapidly turned in response to the signal indicative of the coincidence of these amounts 21 and 22 with each other, thereby kicking off the program trip pin 12 for terminating the heating step. Before this occur, it is controlled by the process timer 10 according to the time mode. It is, however, to be noted that, unless the time set to the mini-timer 30 is elapsed, a rapid turn signal will not be outputed even though the actual amount 21 of equivalent cure unit has become equal to the predetermined value 22.

(7) Where the actual amount 21 of equivalent cure unit has not yet become equal to the predetermined value 22, the program trip pin 12 for terminating the heating step will be kicked off upon the lapse of the time set to the process timer 10.

(8) The supply of the heating water and that of the cooling water are interrupted and intitiated, respectively. The process timer 10, which has been temporarily held inoperative resumes its operation and the process steps subsequent to the cooling step are controlled by the process timer 10 according to the time mode.

(9) When during the above described operation the maximum necessary time for the heating step has elapsed while the actual amount 21 of equivalent cure unit remains smaller than the predetermined amount 22 thereof, the supply of the heating water is interrupted on the one hand and the supply of the cooling water is initiated on the other hand irrespective of the actual amount of equivalent cure unit.

(10) When the time set to the process timer 10 for the cooling step to be performed has elapsed, the diaphragm valve for the cooling water is closed and the diaphragm valve for exhausting is opened.

(11) When the time set the process timer 10 for the exhausting step to be performed has elapsed, the diaphragm valve for exhausting is closed and the diaphragm valve for vacuum is opened.

(12) When the time set to the process timer 10 for the vacuum step to be performed has elapsed, the diaphragm valve for the vacuum is closed and the vulcanizing machine 25 is opened, thereby completing one cycle of operation.

(13) The sensor probe of the temperature sensor 23 is withdrawn by the air cylinder from the tire 24 and the tire forming mold before the completion of the state of vulcanization.

(14) The amount 21 of equivalent cure unit measured up until the withdrawal of the sensor probe is displayed as data by means of the printer together with the time then elapsed.

(15) The computer 20 is brought to the stand-by position upon the opening of the vulcanizing machine 25 subsequent to the completion of the state of vulcanization.

The above described procedures are repeated.

In this example, the process timer 10 may be provided with a step section for generating an interrupt signal corresponding to the termination of the time required to perform the heating step so that the comparison of the actual amount of equivalent cure unit with the predetermined amount thereof can be initiated in response to such interrupt signal.

EXAMPLE 5

(1) Times for the respective steps of the vulcanizing process to be performed are set to the digital timer 10 while said digital process timer 10 is provided with a step section so that an interrupt signal corresponding to the termination of the time for the heating step can be outputed.

| Step No. | Setting Examples Vulcanizing Medium | Preset Time (min) |
| --- | --- | --- |
| 0 | — | — |
| 1 | Heating Water | 5.0 |
| 2 | Heating Water | 10.0 |
| 3 | Cooling Water | 2.0 |
| 4 | Exhaust | 1.0 |
| 5 | Vacuum | 1.0 |
| 6 | — | — |

In the above setting examples, the maximum and minimum necessary times for the heating step are separately set at the first and second steps to the digital timer, respectively.

(2) The tire 24 is placed in the tire forming mold in the vulcanizing machine 25.

(3) Simultaneously with the closure of the vulcanizing machine 25, the digital timer 10 is turned on. Subsequently, the sensor probe of the temperature sensor 23 is inserted into the shoulder of the tire through the insertion hole in the tire forming mold.

(4) When the digital timer 10 has been turned on, the heating water is supplied into a bladder inserted into the tire. The digital timer 10 continues to operate, and the linearizer 28 and the converter 29 measure the temperature at the shoulder of the tire, the actual amount 21 of equivalent cure unit being calculated in the microcomputer 20.

(5) After the lapse of the preset time (minimum necessary time) of 5 minutes for the first step, the step proceeds to the second step and, at the same time, the interrupt signal is generated to the microcomputer 20. The supply of the heating water is continued.

(6) The microcomputer 20 operates in response to the interrupt signal to compare the actual amount 21 equivalent cure unit with the predetermined value 22 thereof. Up until the interrupt signal is received, the vulcanizing machine 25 is controlled according to the time mode.

(a) Where the actual amount 21 of equivalent cure unit is greater than the predetermined value 22, a signal necessary to advance the step of the digital timer 10 to the third step is generated.

(b) Where the actual amount 21 of equivalent cure unit is smaller than the predetermined value 22, the step of the supplying the heating water continues until the both become equal to each other.

(7) Even though the actual amount 21 of equivalent cure unit does not become equal to the predetermined value 22 by reason of failure of the apparatus to operate properly, the next succeeding step is initiated by the digital timer 10 upon the lapse of 10 minutes (maximum necessary time).

(8) The supply of the heating water and that of the cooling water are interrupted and initiated respectively. Subsequent to the termination of the heating step, it is controlled according to the time mode.

(9) After the lapse of the preset time of 2 minutes for the third step, the digital timer 10 starts the next succeeding step and the supply of the cooling water is interrupted while the exhaust step is initiated.

(10) After the lapse of the preset time of 1 minute for the fourth step, the exhaust step terminates and the digital timer 10 proceeds to the next succeeding vacuum step.

(11) After the lapse of the preset time of 1 minute for the fifth step, the vacuum step terminates and the vulcanizing machine 25 is brought to the opened position with the digital timer 10 returning to the original start position, thereby completing one cycle of the vulcanizing process.

(12) The sensor probe of the temperature sensor 23 is withdrawn by the air cylinder from the tire 24 and the mold before the cycle of the vulcanizing process completes.

(13) The actual amount 21 of equivalent cure unit measured up until the withdrawal of the sensor probe is displayed by means of the printer as data together with the time then elapsed.

(14) The computer 20 is brought to the stand-by position upon the opening of the vulcanizing machine 25 subsequent to the completion of the state of vulcanization.

The above described procedures are repeated.

From the foregoing, it has now become clear that the control of the state of vulcanization of the tire according to the equivalent cure unit control mode is carried out only during the heating step of the vulcanizing process and that, by the utilization of the process timer, used in the conventional vulcanizing process, in combination with the computer having no time control circuit, only the heating step is controlled according to the equivalent cure unit control mode whereas the other process steps subsequent to the heating step are controlled according to the time mode by the process timer. Such being the case, as compared with the prior art system, the preset invention is effective to make a contribution, without requiring the increased investment of capitals to the machine and equipment and also without requiring time-consuming and complicated labors, to the production of wheel tires of uniform quality with no variation in the vulcanization uniformity for tires of the same size. The present invention is also effective to reduce the time required to perform the entire vulcanizing process within the range of 6 to 16% of the time hitherto required and, accordingly, effective to minimize the amount of energies (heavy oil) necessary for the production of the wheel tires. Moreover, the present invention is effective to avoid any possible under-curing or over-curing of the wheel tire even if the apparatus fails to operate properly.

Although the present invention has fully been described by way of example with reference to the accompanying drawings, it is to be noted that various changes and modifications are apparent to those skilled in the art. Such changes and modifications are to be understood as included within the true scope of the present invention unless they depart therefrom.

What is claimed is:

1. A method for controlling the state of vulcanization of a wheel tire including the steps of shaping, heating, cooling, exhausting and applying vacuum, which comprises:
    a first control step of controlling the process steps of the vulcanizing process preceding the heating step according to a time mode, using a process timer;
    a second control step of controlling only the heating step according to an equivalent cure unit control mode, said second control step being carried out by,
        (a) measuring the temperature of the tire or a tire forming mold by the use of a temperature sensor,
        (b) calculating the actual equivalent cure amount by the use of a computer according to the Arrhenius' equation or its equivalent coefficient formula $$U = C^{\frac{T-T_o}{Y}} \cdot dt$$

wherein C is the equivalent cure amount, T is the current cure temperature, To is the reference cure temperature, Y is a coefficient and U is the vulcanization amount, using the temperature so measured,
        (c) comparing the actual equivalent cure amount with a predetermined equivalent cure amount thereof at the time a signal indicative of the termination of the preset time required to perform the heating step has been received, said temperature measurement being initiated simultaneously with the start of either the vulcanizing process or the heating step, and
        (d) terminating said heating step when the actual equivalent cure amount becomes equal to the predetermined amount; and
    a third control step of controlling the process steps subsequent to the heating step according to a time mode by the use of the process timer.

2. A method as claimed in claim 1, wherein said signal is an interrupt signal corresponding to the preset time required for the heating step to be performed.

3. An apparatus for controlling the state of vulcanization of a wheel tire including, in combination, shaping means, heating means, cooling means, exhausting means and vacuum means which comprises:
    a temperature sensor for detecting the temperature representative of the temperature of the interior of the tire or of the tire mold;
    a temperature measuring mechanism connected with said temperature sensor;
    a process timer for controlling the time required for a vulcanizing process to be performed;
    a computer connected with the process timer and associated with the temperature measuring mechanism for calculating the actual equivalent cure amount only during operation of the heating means of vulcanizing apparatus and for comparing said actual amount so calculated with a predetermined amount; and
    a mechanism for terminating the operation of only the heating means when the actual amount becomes equal to the predetermined amount.

4. The apparatus as claimed in claim 3, wherein said process timer has a step section for generating an interrupt signal corresponding to the termination of the time required to operate the heating means.

5. The apparatus as claimed in claim 3 or 4, wherein said process timer has an additional timer operatively associated therewith.

6. A method for controlling the state of vulcanization of a wheel tire including the steps of shaping, heating, cooling, exhausting and applying vacuum, which comprises:

a first control step of controlling the process steps of the vulcanizing process preceding the heating step according to a time mode, using a process timer;

a second control step of controlling only the heating step according to an equivalent cure unit control mode, said second control step being carried out by, (a) measuring the temperature of the tire or a tire forming mold by the use of a temperature sensor, (b) calculating the actual equivalent cure amount by the use of a computer according to the Arrhenius' equation or its equivalent coefficient formula $$U = C^{\frac{T-T_o}{Y}} \cdot dt$$

wherein C is the equivalent cure amount, T is the current cure temperature, To is the reference cure temperature, Y is a coefficient and U is the vulcanization amount, using the temperature so measured, and (c) comparing the actual equivalent cure amount with a predetermined equivalent cure amount at the time a signal indicative of the lapse of the minimum necessary preset time for the heating step to be performed has been received, said temperature measurement being initiated simultaneously with the start of the vulcanizing process, said heating step being terminated when the actual equivalent cure amount is equal to the predetermined amount or in response to a signal indicative of the maximum necessary preset time for the heating step to be performed has elapsed in the event the actual equivalent cure amount fails to become equal to the predetermined amount by the occurrence of an erroneous operation; and a third control step of controlling the process steps subsequent to the heating step according to the time-mode by using the process timer.

7. The method as claimed in claim 6, wherein said first mentioned signal is either a signal or an interrupt signal generated from the process timer, and wherein said maximum necessary preset time signal is a signal generated from an additional timer provided in the process timer.

8. The method as claimed in claim 6, wherein said first mentioned signal is a signal generated from an additional timer provided in the process timer and wherein said second mentioned signal is a signal or interrupt signal generated from the process timer.

9. The method as claimed in claim 6, 7 or 8, wherein, when the actual amount of equivalent cure unit is equal to the predetermined amount, the process timer, upon receipt of a signal so indicating, causes its time dial to be rapidly turned to the start position for the next suceeding process step, thereby terminating the heating step.

10. The method as claimed in claim 6, wherein said first mentioned signal is either a signal or an interrupt signal generated from a digital process timer, and wherein said maximum necessary preset time signal is a signal generated from said digital process timer.

* * * * *